United States Patent
Hikami et al.

(10) Patent No.: US 6,266,216 B1
(45) Date of Patent: *Jul. 24, 2001

(54) INDUCTIVE/MR COMPOSITE TYPE THIN-FILM MAGNETIC HEAD WITH NLTS REDUCTION

(75) Inventors: Fuminori Hikami; Kenji Komaki; Masayuki Takagishi, all of Misima-gun (JP)

(73) Assignee: Read-Rite Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 3 days.

(21) Appl. No.: 08/965,811

(22) Filed: Nov. 7, 1997

(30) Foreign Application Priority Data

Nov. 8, 1996 (JP) .................................................... 8-311231

(51) Int. Cl.[7] ................................................. G11B 5/31
(52) U.S. Cl. ........................................................ 360/317
(58) Field of Search .................................. 360/110, 113, 360/126

(56) References Cited

FOREIGN PATENT DOCUMENTS

| 63-103412 | * | 5/1988 | (JP) . |
| 5-46937 | * | 2/1993 | (JP) . |
| 5-46938 | * | 2/1993 | (JP) . |
| 09-106509 | * | 4/1997 | (JP) . |
| 9-106509 | * | 4/1997 | (JP) . |

* cited by examiner

Primary Examiner—Brian E. Miller
(74) Attorney, Agent, or Firm—Blakely, Sokoloff, Taylor & Zafman, LLP

(57) ABSTRACT

An inductive/MR composite type thin-film magnetic head. In one embodiment, the inductive/MR composite type thin-film magnetic head is equipped with an inductive head used for writing. The inductive head includes an insulating film and a conductive coil that are laminated between upper and lower magnetic films. The inductive/MR composite type thin-film magnetic head also includes a magnetic resistance (MR) head used for read-out. The inductive/MR composite type thin-film magnetic head is characterized by the fact that a distance L between [i] the upper and lower magnetic poles, which face each other across a magnetic gap at the tip ends of the aforementioned upper and lower magnetic films and [ii] the point where the aforementioned upper and lower magnetic films are joined together has the relationship of L<8400/X, with respect to the desired data transmission rate X (Mbit/sec) of the aforementioned thin-film magnetic head. In one embodiment, L is less than or equal to 60 microns.

3 Claims, 3 Drawing Sheets

INDUCTIVE/MR COMPOSITE TYPE THIN-FILM MAGNETIC HEAD WITH NLTS REDUCTION

BACKGROUND OF THE INVENTION

1. Field of the Invention

The present invention concerns an inductive/MR composite type thin-film magnetic head which is integrally equipped with an inductive head used for writing and a magnetic resistance (MR) head used for read-out, and which can be used in recording and playback devices of various types of equipment such as computers and word processors, etc., e.g., in hard disk drives, etc. More specifically, the present invention concerns an inductive/MR composite type thin-film magnetic head which is designed so that magnetic recording can be performed at a high density exceeding 155 Mbit/cm$^2$ (1000 Mbit/in$^2$), and at a high data transmission rate exceeding 100 Mbit/sec.

2. Background Information

Recently, in order to deal with the increased density of magnetic recording and the reduced size and increased output of magnetic recording and playback devices, MR heads, which have a high playback sensitivity and in which the playback output does not depend on the relative speed with the recording medium, have been used for read-out purposes. Furthermore, composite type thin-film magnetic heads in which such an MR head is integrally combined with an inductive head used for writing, thus making it possible to reduce the track width and lower the impedance by reducing the number of coil turns, have also been employed. In conventional composite type thin-film magnetic heads, as is shown in for example FIGS. 1 and 2, an MR head 6 consisting of an MR element 5 which is sandwiched between a lower shield 3 and an upper shield 4 is formed on the surface of a substrate 1 consisting of a ceramic material, with an insulating film 2 being interposed between the MR head 6 and the substrate 1. An inductive head 12 which uses the aforementioned upper shield as a lower magnetic film, and in which a magnetic gap 7, organic insulating layers 8 and 9, a conductive coil 10 and an upper magnetic film 11 are laminated with the aforementioned lower magnetic film, is formed on top of the MR head 6.

The recording of signals on a recording medium 15 is accomplished by applying a square-wave writing current to the coil 10, thus generating a magnetic flux in the magnetic gap between the mutually facing tip end portions of the aforementioned upper and lower magnetic films, so that magnetization inversion regions known as magnetization transitions are formed with the timing of the plus and minus switching of the aforementioned current. Recorded signals are played back as follows: i.e., the magnetic flux from the recording medium 15, which passes through the MR element, varies with the timing at which the above-mentioned magnetization transitions pass through the area between the aforementioned upper and lower shields, thus causing a variation in the resistance of the MR element.

A writing head with a superior recording capacity is necessary in order to realize high-speed, high-density recording in such a composite type thin-film magnetic head. However, a lag component is generated in the writing current that flows through the coil of the inductive head as a result of the impedance of this coil; if this component becomes large, a distortion known as "blunting" is generated in the square wave of the writing current. Furthermore, an eddy current loss is generated in the yoke portions of the upper and lower magnetic films by the writing current flowing through the coil, and this further generates a delay in the high-frequency component of the magnetic field between the upper and lower magnetic poles. Accordingly, in cases where signals are written onto the recording medium at a high density, the adjacent magnetization transitions interfere with each other so that a non-linear shift of the writing position known as a non-linear transition shift (NLTS) is generated in the recording medium, and this increases the read-out error during playback of the signals.

In "Ko-Bs Poru Indakutibu/MR Heddo Fukugo Hakumaku Heddo" ("High-Bs Pole Inductive/MR Head Composite Thin-Film Head") by Hiroaki Kawashima et al. (Nippon Oyo Jiki Gakkai Gakujutsu Koen Gaiyoshu (1995) p. 221), a composite type thin film magnetic head is described in which NLTS is reduced by using a two-layer structure consisting of conventional NiFe and high-flux-density FeZrN in the tip end portion of the upper magnetic pole. As is clear from this description, the above-mentioned delay generated in the high-frequency component of the magnetic field between the upper and lower magnetic poles can easily be ameliorated if the material used to form the magnetic pole parts of the writing head is changed from the conventional NiFe (permalloy) to a material with a higher flux density, e.g., cobalt/zirconium/tantalum (CoZrTa, cobalt/niobium/tantalum (CoNbTa) or iron/zirconium/nitrogen (FeZrN).

However, in cases where the magnetic pole parts of an inductive head are formed using such high-flux-density materials, there is a danger of corrosion by water and acids, especially in cutting and washing processes used to cut respective chips from wafers and to form these chips into sliders. Accordingly, conventional thin-film magnetic head manufacturing processes cannot be used "as is." Furthermore, in order to achieve practicalization, there is a renewed demand for sufficient advance confirmation of the reliability of the writing head in cases where such a change of the magnetic pole material is made.

SUMMARY OF THE INVENTION

An inductive/MR composite type thin-film magnetic head is equipped with an inductive head used for writing in which an insulating film and a conductive coil are laminated between upper and lower magnetic films. The inductive/MR composite type thin-film magnetic head also includes a magnetic resistance (MR) head used for read-out. The inductive/MR composite type thin-film magnetic head is characterized by the fact that the distance L (microns) between [i] the upper and lower magnetic poles, which face each other across a magnetic gap at the tip ends of the aforementioned upper and lower magnetic films and [ii] the point where the aforementioned upper and lower magnetic films are joined together has the relationship of L<8400/X, with respect to the desired data transmission rate X (Mbit/sec) of the aforementioned thin-film magnetic head.

BRIEF DESCRIPTION OF THE DRAWINGS

The present invention is illustrated by way of example and not limitation in the accompanying figures.

DETAILED DESCRIPTION

In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

The present invention was devised in light of the above-discussed problems. Accordingly, one embodiment of the present invention is an inductive/MR composite type thin-film magnetic head which can easily be manufactured using conventional processes "as is," uses a conventional permalloy material as the magnetic pole material of the inductive head, and ameliorates NLTS. In one embodiment, the generation of read-out errors during the playback of signals is reduced by reducing the NLTS generated during the writing of signals with an inductive/MR composite type thin-film magnetic head in accordance with the teachings of the present invention.

In one embodiment, an inductive/MR composite type thin-film magnetic head is equipped with an inductive head used for writing in which an insulating film and a conductive coil are laminated between upper and lower magnetic films. The inductive/MR composite type thin-film magnetic head also includes a magnetic resistance (MR) head used for read-out. The inductive/MR composite type thin-film magnetic head is characterized by the fact that the distance L (microns) between [i] the upper and lower magnetic poles, which face each other across a magnetic gap at the tip ends of the aforementioned upper and lower magnetic films, and [ii] the point where the aforementioned upper and lower magnetic films are joined together has the relationship of L<8400/X, where X is the desired data transmission rate (Mbit/sec) of the aforementioned thin-film magnetic head. In one embodiment, the distance L in the inductive/MR composite type thin-film magnetic head is 60 microns or less.

As a result of the length of the yoke portions of the upper and lower magnetic films of the inductive head thus being restricted in accordance with the data transmission rate, the effect of eddy current loss caused by the writing current flowing through the coil is reduced. Accordingly, the delay of the high-frequency component generated in the magnetic field between the upper and lower magnetic poles can be ameliorated, and the NLTS can be reduced. Thus, a highly reliable composite type thin-film magnetic head in accordance with the teachings of the present invention can be obtained easily and at low cost using a conventional permalloy material as the magnetic pole material, and using conventional manufacturing processes "as is."

Figure 1:
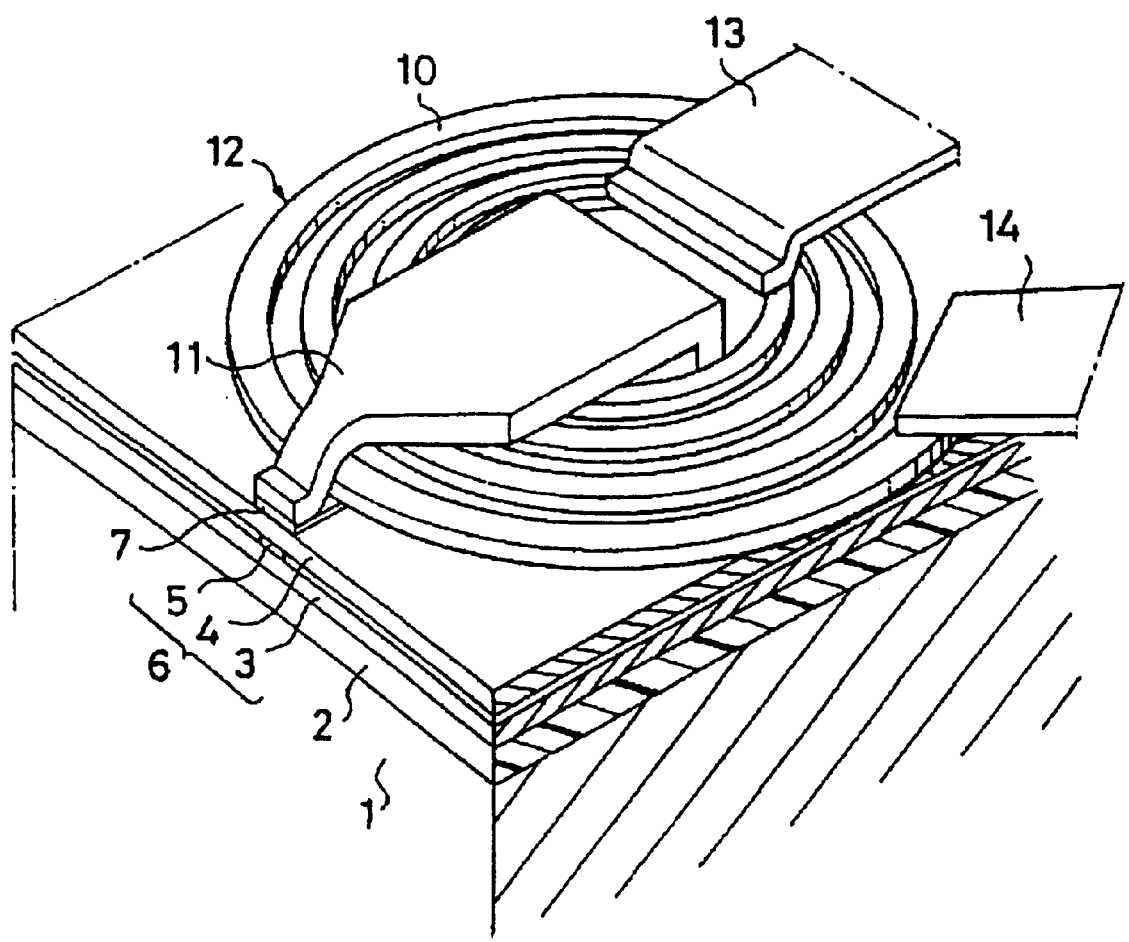
FIG. 1 is a schematic perspective view which illustrates the structure of one embodiment of an inductive/MR composite type thin-film magnetic head in accordance with the teachings of the present invention.
Figure 2:
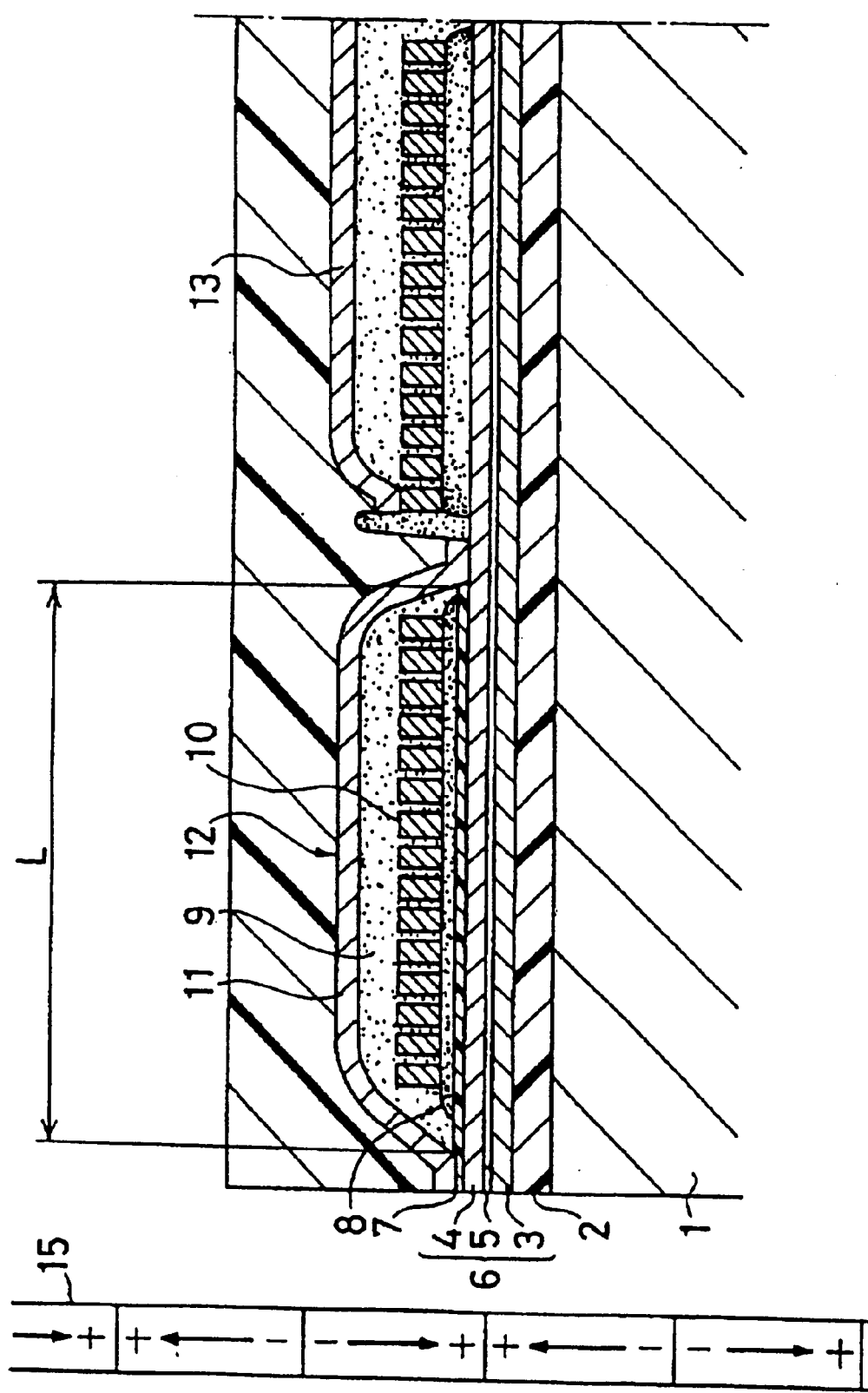
FIG. 2 is a cross-sectional view of an inductive/MR composite type thin-film magnetic head in accordance with the teachings of the present invention.

In particular, one embodiment of an inductive/MR composite type thin-film magnetic head of the present invention is illustrated in FIGS. 1 and 2. In this composite type thin-film magnetic head, as in a conventional head, an insulating film 2 consisting of alumina or Si, etc., is deposited on a substrate 1 consisting of an $Al_2O_3$—TiC type ceramic material. Then, an MR head 6 which has a lower shield 3 and upper shield 4 (formed by the plating or sputtering deposition of a permalloy type alloy, cobalt type alloy or iron-tungsten alloy), and an MR element 5 which is sandwiched between the aforementioned shields, is formed.

The MR element 5 is constructed from a magnetic resistance thin film consisting of NiFe, etc., and a bias film and/or magnetic domain stabilizing film, etc., used to reduce the distortion of the playback signal, which are installed between upper and lower gap layers consisting of insulating films of alumina, etc.

The inductive head used for writing is formed by laminating a magnetic gap film 7 consisting of alumina (which is used to form the magnetic gap), organic insulating layers 8 and 9 consisting of a novolak type resin, a conductive coil 10 with a single layer structure consisting of Cu, and an upper magnetic layer 11 consisting of an NiFe plating film, on the surface of the upper shield 4 (which also acts as the lower magnetic film) using a conventional process "as is." Respective coil lead wires 13 and 14 are connected to the innermost circumferential portion and outermost circumferential portion of the coil 10.

In the composite type thin-film magnetic head of the present embodiment, the length of the yoke portion of the upper magnetic film in FIG. 2, i.e., the distance L (microns) from the mutually facing upper and lower magnetic poles to the point where the aforementioned upper and lower magnetic films are joined together, is set so that L<8400/X, where X is the desired data transmission rate (Mbit/sec). As a result of this shortening of the distance L, the effects of eddy current loss in the aforementioned yoke portion are correspondingly reduced, so that the delay of the high-frequency component of the magnetic field in the upper and lower magnetic poles which face each other across the magnetic gap film 7 at the tip ends of the upper and lower magnetic films is alleviated. Furthermore, as a result of the shortening of the distance L, the leakage of magnetic flux between the aforementioned upper and lower magnetic poles is reduced, so that the magnetic efficiency is improved.

Meanwhile, the number of turns in the coil is determined so that the aforementioned inductive head generates a magnetic field of the intensity required for writing. Since the magnetic intensity is improved when the distance L is shortened (as was described above), the number of turns required in the coil is correspondingly reduced.

In actuality, the distance L is determined according to the coil pitch and coil structure so that the required number of coil turns T is realized. For example, in a case where the number of coil turns T is 11, the distance L=60 microns when the coil pitch is 5 microns; furthermore, the distance L=40 microns when the coil pitch is 3 microns, and the distance L=30 microns when the coil pitch is 2 microns. Moreover, in cases where the coil is constructed with a two-layer structure, L can be made shorter at the same required number of coil turns.

Furthermore, the minimum value of the required number of coil turns T varies according to the intensity of the required writing magnetic field and the saturation magnetic flux density of the magnetic pole material; generally, however, this value is approximately 5 to 8 in practical terms. The coil pitch is naturally influenced by the precision of the photolithographic technique in the manufacturing process; generally, however, this pitch is set at 1.5 microns or less in practical terms. Considering these facts, the current minimum value of the distance L may be viewed as being approximately 10 microns.

In the present embodiment, when a composite type thin-film magnetic head with a data transmission rate of 140 (Mbit/sec) was manufactured, and the resulting relationship between the magnitude of the NLTS (%) generated in this case and the distance L was tested, the results shown in FIG.

3 were obtained. In the thin-film magnetic head used in this test, the lower shield was formed by an NiFe plating film with a thickness of approximately 2 microns, the lower gap layer was formed by a sputtered alumina film with a thickness of 0.07 microns, the MR element was formed by a magnetic resistance thin film consisting of a sputtered NiFe film, a bias film consisting of NiFeRh and a magnetic domain stabilizing film consisting of CoPt, the upper gap layer was formed by an alumina film with a thickness of 0.9 microns, and the upper magnetic film was formed by an NiFe plating film with a thickness of 3.5 microns. Furthermore, the number of turns T in the coil was fixed at 12, and the coil pitch was set at 7 microns when the distance L was 100 microns, and at 3.5 microns when the distance L was 50 microns.

Figure 3:
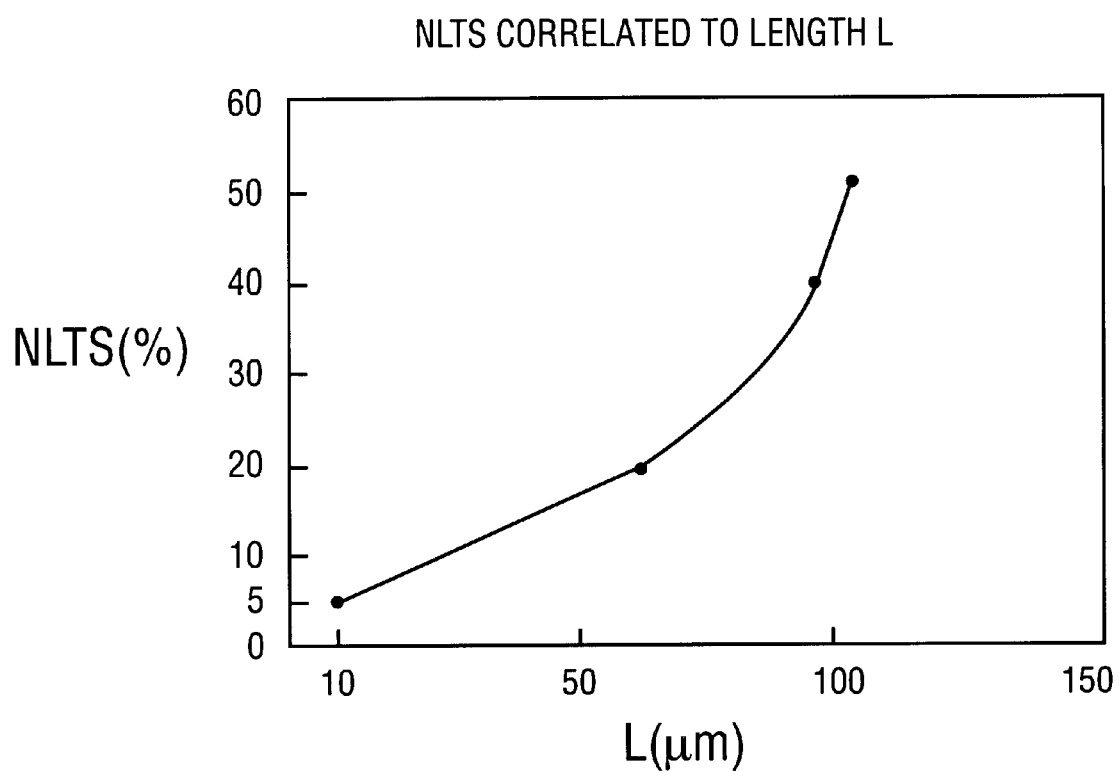
FIG. 3 is a graph which illustrates the relationship between the distance L and NLTS in a inductive/MR composite type thin-film magnetic head in accordance with the teachings of the present invention.

As is clear from FIG. 3, NLTS increases with an increase in the length L of the yoke portions of the upper and lower magnetic films. Furthermore, it is seen that when L=60 microns, the NLTS value is less than 20%, so that especially good characteristics are obtained.

In the inductive/MR composite type thin-film magnetic head of the present invention, as a result of the use of the above-mentioned construction, a conventional permalloy material can be used as the magnetic pole material of the writing head, and the head can be manufactured using conventional manufacturing processes "as is." Furthermore, high-speed, high-density recording with a small NLTS value can be achieved, and a highly reliable composite type thin-film magnetic head can be provided at a low cost.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An inductive/MR composite thin-film magnetic head comprising:

an inductive head used for writing including an insulating film and a conductive coil, the insulating film and the conductive coil laminated between an upper magnetic film and a lower magnetic film, the upper and lower magnetic films forming upper and lower poles, respectively, the upper and lower poles facing each other across a magnetic gap at tip ends of the upper and lower magnetic poles, the conductive coil consisting of only one single layer structure;

a magnetic resistance (MR) head used for read-out, wherein a distance L between [i] the tip ends of the upper and lower magnetic poles and [ii] a point where the upper and lower magnetic films are joined together has a relationship of L<8400/X, wherein X is a desired data transmission rate (Mbit/sec) of the inductive/MR composite thin-film magnetic head; and the distance L is between approximately 10 and 60 microns.

2. The inductive/MR composite type thin-film magnetic head of claim 1, wherein the conductive coil having a number of turns T, and T is between approximately 5 and 12.

3. The inductive/MR composite type thin-film magnetic head of claim 1, wherein the conductive coil having a number of turns T, and T is between 8 and 11.

* * * * *